(12) United States Patent
Côté

(10) Patent No.: US 12,275,824 B2
(45) Date of Patent: Apr. 15, 2025

(54) PROCESSES FOR RECYCLING POLYSTYRENE WASTE

(71) Applicant: POLYSTYVERT INC., Anjou (CA)

(72) Inventor: Roland Côté, St-Antoine-sur-Richelieu (CA)

(73) Assignee: Polystyvert Inc., Anjou (CA)

( * ) Notice: Subject to any disclaimer, the term of this patent is extended or adjusted under 35 U.S.C. 154(b) by 0 days.

(21) Appl. No.: 17/857,028

(22) Filed: Jul. 3, 2022

(65) Prior Publication Data

US 2023/0002583 A1 Jan. 5, 2023

Related U.S. Application Data

(63) Continuation of application No. 17/353,395, filed on Jun. 21, 2021, now Pat. No. 11,407,878, which is a
(Continued)

(51) Int. Cl.
*C08J 11/08* (2006.01)
*B29B 17/02* (2006.01)
(Continued)

(52) U.S. Cl.
CPC ............. *C08J 11/08* (2013.01); *B29B 17/02* (2013.01); *C08F 112/08* (2013.01); *C08L 25/06* (2013.01);
(Continued)

(58) Field of Classification Search
CPC . B29B 17/02; B29B 17/04; B29B 2017/0293; B29B 2017/0484;
(Continued)

(56) References Cited

U.S. PATENT DOCUMENTS 3,043,785 A 7/1962 Wright et al.
3,836,486 A 9/1974 Hafner
(Continued)

FOREIGN PATENT DOCUMENTS

AU 7989775 10/1976
AU 703220 3/1997
(Continued)

OTHER PUBLICATIONS

Schlummer et al., "Characterisation of polymer fractions from waste electrical and electronic equipment (WEEE) and Implications for waste management", Chemosphere 67 (2007) 1866-1876, Jan. 17, 2007.
(Continued)

*Primary Examiner* — Frances Tischler
(74) *Attorney, Agent, or Firm* — Smart & Biggar LP

(57) ABSTRACT

There are provided recycled polystyrene polymers having a melt flow index of less than about 25 g/10 min. There are provided processes for recycling polystyrene waste. The processes can comprise dissolving said polystyrene waste in p-cymene under conditions to obtain a polystyrene/p-cymene mixture, adding the polystyrene/p-cymene mixture to a hydrocarbon polystyrene non-solvent under conditions to obtain precipitated polystyrene and washing the precipitated polystyrene with additional portions of hydrocarbon polystyrene non-solvent under conditions to obtain twice-washed polystyrene. The twice-washed polystyrene can optionally be dried and formed into polystyrene pellets. There is also provided recycled polystyrene obtained from such processes for recycling polystyrene waste.

4 Claims, 1 Drawing Sheet

Related U.S. Application Data continuation of application No. 16/699,386, filed on Nov. 29, 2019, now abandoned, which is a continuation of application No. 15/515,817, filed as application No. PCT/CA2015/051006 on Oct. 5, 2015, now abandoned.

(60) Provisional application No. 62/059,611, filed on Oct. 3, 2014.

(51) Int. Cl.
    *C08F 112/08* (2006.01)
    *C08J 11/00* (2006.01)
    *C08L 25/00* (2006.01)
    *C08L 25/06* (2006.01)

(52) U.S. Cl.
    CPC ............ *C08J 11/00* (2013.01); *C08J 2325/06* (2013.01); *C08L 25/00* (2013.01); *Y02W 30/62* (2015.05)

(58) Field of Classification Search
    CPC ............ B29K 2025/06; B29K 2105/04; C08F 112/08; C08J 11/00; C08J 11/08; C08J 2325/06; C08L 25/00; C08L 25/06; Y02W 30/62
    See application file for complete search history.

(56) References Cited

U.S. PATENT DOCUMENTS

| | | |
|---|---|---|
| 4,003,881 A | 1/1977 | Sidebotham et al. |
| 4,031,039 A | 6/1977 | Mizumoto |
| 4,067,826 A | 1/1978 | Emery |
| 4,071,479 A | 1/1978 | Broyde et al. |
| 4,360,486 A | 11/1982 | Dibiasi et al. |
| 5,232,954 A | 8/1993 | Peters |
| 5,269,948 A | 12/1993 | Kruthchen |
| 5,278,282 A | 1/1994 | Nauman et al. |
| 5,438,079 A | 8/1995 | Paris |
| 5,552,494 A | 9/1996 | Iwamoto et al. |
| 5,594,035 A | 1/1997 | Walsh |
| 5,596,045 A | 1/1997 | Scherzer et al. |
| 5,629,352 A | 5/1997 | Shiino et al. |
| 5,824,709 A | 10/1998 | Suka |
| 5,859,072 A | 1/1999 | Emori |
| 5,891,403 A | 4/1999 | Badger et al. |
| 5,994,417 A | 11/1999 | Roberts et al. |
| 6,034,142 A | 3/2000 | Varadarajan et al. |
| 6,090,862 A | 7/2000 | Tatsuda et al. |
| 6,169,121 B1 | 1/2001 | Noguchi |
| 6,326,408 B1 | 12/2001 | Jura |
| 6,403,661 B1 | 6/2002 | Usui et al. |
| 6,440,306 B1 | 8/2002 | Ditter et al. |
| 6,500,872 B1 | 12/2002 | Noguchie et al. |
| 6,548,561 B1 | 4/2003 | Müller et al. |
| 7,728,047 B2 | 6/2010 | Notari |
| 7,745,503 B2 | 6/2010 | Notari et al. |
| 7,893,195 B2 | 2/2011 | Fassiau et al. |
| 8,071,656 B2 | 12/2011 | Waibel et al. |
| 8,138,232 B2 | 3/2012 | Maeurer et al. |
| 8,225,937 B2 | 7/2012 | Schlummer |
| 8,242,212 B2 | 8/2012 | Grossetete et al. |
| 8,314,207 B2 | 11/2012 | Friedlaender |
| 8,389,636 B2 | 3/2013 | Grossetete et al. |
| 8,546,455 B2 | 10/2013 | Poutch et al. |
| 8,609,778 B1 | 12/2013 | Frost et al. |
| 8,809,459 B2 | 8/2014 | Grossetete et al. |
| 8,912,296 B1 | 12/2014 | Bouquet et al. |
| 8,969,638 B2 | 3/2015 | Tippet et al. |
| 9,045,612 B2 | 6/2015 | Fluck et al. |
| 9,650,313 B2 | 5/2017 | Tippet et al. |
| 9,664,175 B2 | 5/2017 | Vander Lind et al. |
| 9,695,259 B2 | 7/2017 | Layman |
| 9,890,225 B2 | 2/2018 | Layman et al. |
| 9,896,556 B2 | 2/2018 | Gila et al. |
| 10,882,940 B2 | 1/2021 | Moyses et al. |
| 10,961,367 B2 | 3/2021 | Côté |
| 11,407,878 B2 | 8/2022 | Côté |
| 2002/0062054 A1 | 5/2002 | Cistone et al. |
| 2003/0191202 A1 | 10/2003 | Maurer et al. |
| 2004/0229965 A1 | 11/2004 | Maurer et al. |
| 2005/0056813 A1 | 3/2005 | Hamano |
| 2006/0241193 A1 | 10/2006 | Notari et al. |
| 2007/0112081 A1 | 5/2007 | Hahn et al. |
| 2007/0249741 A1 | 10/2007 | Yuan |
| 2007/0265361 A1 | 11/2007 | Maurer et al. |
| 2008/0221228 A1 | 9/2008 | Notari |
| 2008/0281002 A1 | 11/2008 | Maeurer et al. |
| 2009/0130383 A1 | 5/2009 | Harelle |
| 2010/0222532 A1 | 9/2010 | Shuler et al. |
| 2011/0021647 A1 | 1/2011 | Poutch et al. |
| 2013/0005912 A1 | 1/2013 | Wang et al. |
| 2017/0022346 A1 | 1/2017 | Weeden, Jr. |
| 2017/0298207 A1 | 10/2017 | Côté |
| 2017/0299207 A1 | 10/2017 | Trevelyan |
| 2018/0022888 A1 | 1/2018 | Li et al. |
| 2020/0165407 A1 | 5/2020 | Côté |
| 2020/0317884 A1 | 10/2020 | Côté |
| 2021/0380777 A1 | 12/2021 | Côté |
| 2023/0002583 A1 | 1/2023 | Côté |

FOREIGN PATENT DOCUMENTS

| | | |
|---|---|---|
| CA | 2297807 | 2/1999 |
| CA | 2274397 | 12/1999 |
| CA | 2615848 | 1/2007 |
| CA | 2959082 | 4/2016 |
| CN | 1143653 | 2/1997 |
| CN | 101307150 | 11/2008 |
| CN | 101367956 | 2/2009 |
| CN | 107641216 | 1/2018 |
| CN | 111257270 A | 6/2020 |
| DE | 4319180 A1 | 1/1994 |
| DE | 4343784 | 7/1994 |
| DE | 19735827 | 2/1999 |
| DE | 10 2005 026451 A1 | 12/2006 |
| EP | 0430496 | 6/1991 |
| EP | 894818 A1 | 2/1992 |
| EP | 0491836 | 7/1992 |
| EP | 0949293 A2 | 10/1999 |
| EP | 1462474 | 9/2004 |
| EP | 1616903 | 1/2006 |
| EP | 2865708 | 4/2015 |
| EP | 2553017 | 6/2016 |
| EP | 2276801 | 3/2017 |
| EP | 3575353 A1 | 4/2019 |
| EP | 2513212 | 4/2021 |
| EP | 3853297 | 7/2021 |
| GB | 856577 | 12/1960 |
| JP | 093239 A | 1/1997 |
| JP | H10195232 | 7/1998 |
| JP | H10338768 A | 12/1998 |
| JP | IPH1180418 | 3/1999 |
| JP | 2000248109 | 9/2000 |
| JP | 2001172423 | 6/2001 |
| JP | 2002224652 A | 8/2002 |
| JP | 2002-264129 A | 9/2002 |
| JP | 2004051620 | 2/2004 |
| JP | 2005154525 A | 6/2005 |
| JP | 2005162847 A | 6/2005 |
| JP | 2007144829 A | 6/2007 |
| JP | 2008063511 A | 3/2008 |
| JP | 2015160900 A | 9/2015 |
| JP | 2016010906 A1 | 1/2016 |
| KR | 20220170372 A | 12/2022 |
| WO | 9424194 | 10/1994 |
| WO | 9500582 | 1/1995 |
| WO | 200214413 A1 | 2/2002 |
| WO | 0248246 | 6/2002 |
| WO | 03035729 | 5/2003 |
| WO | 2003087215 A1 | 10/2003 |
| WO | 2005123817 A1 | 12/2005 |

(56) References Cited

FOREIGN PATENT DOCUMENTS

| WO | 2007003691 | | 1/2007 |
|---|---|---|---|
| WO | 2007009559 | | 1/2007 |
| WO | 2010098900 | A1 | 9/2010 |
| WO | 2011123597 | | 10/2011 |
| WO | 2015199561 | | 12/2015 |
| WO | 2016049782 | | 4/2016 |
| WO | 2017064292 | | 4/2017 |
| WO | 2022144158 | A1 | 7/2022 |
| WO | 2023012695 | A1 | 2/2023 |

OTHER PUBLICATIONS

"Toxicological Risks of Selected Flame-Retardant Chemicals", Subcommittee on Flame-Retardant Chemicals; Committee on Toxicology; Board on Environmental Studies and Toxicology; Commission on Life Sciences; National Research Council (2000). (The year or publication is sufficiently earlier than the effective U.S. filing date so that the particular month of publication is not an issue).

English Translation—Machine Generated of KR20220170372A, "Waste Plastic Recycling Process", published on Dec. 29, 2022.

CreaSolv, "Closing the PS Loop: Our contribution to the concept of Circular Economy", CreaSolv process plus a bromine recovery for removal of HBCDD and destruction into bromine to be used in a new sustainable polymeric FR (2018).

English Abstract—Machine Generated of RO88225B, "Process for Purifying Sewage Resulting From Polystyren Fabrication", published on Dec. 31, 1985.

English Abstract of WO2006098287(A1), "Method and apparatus for recovering (rubber-reinforced) styrene resin composition", published on Sep. 21, 2006.

English Translation—Machine Generated of DE19735827A1, "Polymerization of Styrene in Presence of Ethyl Benzene and Contaminants", published on Feb. 25, 1999.

English Translation—Machine Translation of CN101307150(A), "Novel method for recovering waste and old polystyrol", published on Nov. 19, 2008.

English Translation—Machine Translation of CN107641216(A), "Recycling method of expanded polystyrene waste", published on Jan. 30, 2018.

English Translation—Machine Translation of EP3016998A1, "Method for increasing the concentration of at least one polymer from a polymer-containing waste material, and polymer recyclate", published on May 11, 2016.

English Translation—Machine Translation of WO03035729A2, "Recycling of waste expanded polystyrene foams to give products which may be re-expanded", published on May 1, 2003.

Fe et al., "Destruction of the flame retardant hexabromocyclododecane in a full-scale municipal solid waste Incinerator", Waste Manag Res., Feb. 2015; 33(2): 165-74.

Feng et al., "Synthesis and Surface Properties of Polystyrene-graft-poly(ethylene glycol) Copolymers", Journal of Applied Polymer Science, vol. 103, 1458-1465 (2007). (The year of publication is sufficiently earlier than the effective U.S. filing date so that the particular month of publication is not an issue).

Garcia et al., "Study of the solubility and stability of polystyrene wastes in a dissolution recycling process", Waste Management 29 (Feb. 2009) 1814-1818.

Gonzalez et al., "Waste expanded polystyrene recycling by cymene using liquid or super critical CO2 for solvent recovery", published on Apr. 23, 2018.

Gutierrez et al., "Determination of the high-pressure phase equilibria of Polystyrene/p-Cymene in presence of CO2", J. of Supercritical fluids 92 (Jun. 2014) 288-298.

Hadi et al., "Reconditioning process of waste low density polyethylene using new technique", Journal of Purity, Utility Reaction and Environment, vol. 1, No. 8, Oct. 2012, pp. 400-410.

Kampouris et al., "Solvent Recycling of Rigid Poly(Vinyl Chloride) Bottles", Journal of Vinyl Technology, Jun. 1986, vol. 8, No. 2.

Notice of Opposition dated Jun. 3, 2020, European Patent 3 201 246 (Application No. 15 845.1), Proprietor: Polystyver Inc., Opponent: Kraus & Weisert.

Technical Data Sheet of Styron 678E, retrieved from the internet on Jan. 31, 2022.

English Translation—Machine Translated of CN1143653A, "Method for recovering waste polystyrene plastics", published on Feb. 26, 1997.

English Translation—Machine Translated of DE4343784A1, "Polyamid-Rückgewinnung", published on Jul. 14, 1994.

English Translation—Machine Translated of JP2004051620A, "Method for Recovering Useful Product from Waste Plastic", published on Feb, 19, 2004.

English Translation—Machine Translated of WO9500582A1, "Processes for Recycling Waste Polystyrene Foam", published on Jan. 5, 1995.

CreaCycle GmbH, "PolyStyrene-Loop (2016)—CreaSolv Pilot Plant", [online], [retrieved on Mar. 30, 2017]. Retrieved from the Internet <URL:http://www.creacycle.de/en/projects/recycling-of-expanded-poly-styrene-eps/polystyrene-loop-2016.html>, Jan. 1, 2016.

English Abstract and claims of EP1438351A2, "Recycling of waste expanded polystyrene foams to give products which may be re-expanded", published on Jul. 21, 2004.

English Abstract of JP2009120682(A), "Natural solvent for reducing vol. of foamed polystyrene, and method for volume-reducing treatment of foamed polystyrene using the same", published on Jun. 4, 2006.

Hattori et al., "Dissolution of polystyrene into p-cymene and related substances in tree leaf oils", Journal of wood science, 56(2): 169-171, Oct. 2010.

Schlummer et al., "Recycling of flame retarded waste polystyrene foams (EPS and XPS) to PS granules free of hexabromocyclododecane (HBCDD)", Fraunhofer IVV, Recycling Plastics, Germany.Based on http://www.creacycle.de/en/projects/recycling-of-expanded-poly-styrene-eps/polystyrene-loop-2016.html, no date is provided for publication. However, Schlummer et al cites as reference #14 Mark et al. "Destruction of the flame retardant hexabromocyclododecane in a full-scale municipal solid waste incinerator", Waste Man Res. Feb. 2015;33(2):165-74.

Samper et al., "Recycling of Expanded Polystyrene from Packaging", Progress in Rubber, Plastics and Recycling Technology, vol. 26, No. 2, 2010. (The year of publication is sufficiently earlier than the effective U.S. filing date so that the particular month of publication is not in issue).

CreaCycle GmbH, "The CreaSolv Process", [online], [retrieved on Mar. 30, 2017]. Retrieved from the Internet <URL: http://www.creacycle.de/en/the-process.html>, Mar. 30, 2017.

English Abstract of DE10207336(A1), "Densification and purification of foamed polystyrene waste for recycling, by dissolution in specific solvent, e.g. alkylene glycol dialkyl ether, and precipitation, preferably with alcohol", published on Mar. 15, 2003.

English Abstract of DE10207333(A1), "Re-expandable polystyrene production involves dissolving expanded polystyrene waste in polar solvent and precipitation with less polar precipitant also acting as blowing agent", published on May 15, 2003.

Abstract of Garcia et al., "Recycling extruded polystyrene by dissolution with suitable solvents", Journal of Material Cycles and Waste Management, Jan. 2009, vol. 11, Issue 1, pp. 2-5.

Kampouris et al., "A model recovery process for scrap polystyrene foam by means of solvent systems", Conservation & Recycling, vol. 10, No. 4, pp. 315-319, 1987. (The year of publication is sufficiently earlier than the effective U.S. filing date so that the particular month of publication is not an issue).

English Abstract of CN1063883(A), "Method for preparation of coating from recovered foam polystyrene", published on Aug. 26, 1992.

English Abstract of CN1080645(A), "Waste polystyrene recovery and utilization device and process", published on Jan. 12, 1994.

English Abstract of CN1103874(A), "Recovering waste foam polystyrene by gel foam remolding method and regenerating foamable polystyrene", published on Jun. 21, 1995.

English Abstract of CN1749297(A), "Method for recovering waste polystyrene foam plastic", published on Mar. 22, 2006.

(56) References Cited

OTHER PUBLICATIONS

English Abstract of CN86100803(A), "Method for recovering waste polystyrene", published on Sep. 23, 1987.
English Abstract of CN101928405(A), "Method for reproducing PS (Polystyrene) raw material by recovering and separating high-polymer film composite waste plastics", published on Dec. 29, 2010.
English Abstract of CN102675684(A), "Method for extracting polycarbonate from polycarbonate blending modification material", published on Sep. 19, 2012.
English Abstract of CN103224646(A), "Novel technological method for recovering waste polystyrene foam plastics", published on Jul. 31, 2013.
English Abstract of CN107443614(A), "Method of improving transparency of regenerated plastics", published on Dec. 8, 2017.
English Abstract of DE2434925(A1), "Polyvinyl chloride recovery from plastic waste—by dissolving in solvent PPTG. with non-solvent, sep. solid and recovering plasticiser", published on Feb. 12, 1976.
English Abstract of Poulakis et al., "Dissolution/reprecipitation: A model process for PET bottle recycling", Journal of Applied Polymer Science 81(1):91-95, Jul. 2001.
English Abstract of DE19751442(A1), "Recovery of polystyrene from waste material", published on May 27, 1999.
English Abstract of EP0894818(A1), "Process for recycling soluble polymers or polymer blends from plastic containing materials", published on Feb. 3, 1999.
English Abstract of JP2005179466(A), "Recycling apparatus for foamed polystyrene", published on Jul. 7, 2005.
English Abstract of TW200502282(A), "Method of recycling solid waste polystyrene packing materials", published on Jan. 16, 2005.
English Abstract of Poulakis et al., "The dissolution/reprecipitation technique applied on high-density polyethylene: I. Model recycling experiments", Advanced in Polymer Technology, First published: Autumn (Fall) 1995. (The year of publication is sufficiently earlier than the effective U.S. filing date so that the particular month of publication is not an issue).
English Abstract of Poulakis et al., "Recycling of polypropylene by the dissolution/reprecipitation technique: I. A model study", Resources Conservation and Recycling 20(1):31-41, Jun. 1997.
Abstract of D. S. Achilias et al., "Recycling of polymers from plastic packaging materials using the dissolution-reprecipitation technique", Polymer Bulletin, 63, 449-465 (May 13, 2009).
English Translation—Machine Translated of CN101367956A, "Method for recycling polystyrene foamed plastic with vegetable fat methyl ester production as vol. reduction agent", published on Feb. 18, 2009.
Cowie et al., "Polymer-cosolvent systems: 5. Upper and lower critical solution temperatures of polystyrene in n-alkanes", Polymer, Nov. 1983, vol. 24, pp. 1445-1448.
English Translation—Machine Translated of JP2000248109A, "Method of Recycling Styrene-Based Synthetic Resin", published on Sep. 12, 2000.
English Translation—Machine Translated of JP2001172423A, "Method and Apparatus for Recovering Polystyrene", published on Jun. 26, 2001.
English Translation—Machine Translated of JPH1180418A, "vol. Reduction Method and Recycling Method for Foamed polystyrene", published on Mar. 26, 1999.
English Translation—Machine Translated of JPH10195232A, "Continuous Production for Carrying Out Recycling of Expanded Polystyrene by Precipitation", published on Jul. 28, 1998.
English Translation—Machine Translated of JPH10338768A, "Production for Carrying Out Recycling of Expanded Polystyrene with Dissolution and Precipitation using Simple Substance Solvent", published on Dec. 22, 1998.
Lau et al., "Precipitation studies of polystyrene from solution", Makromol. Chem. 185, 1219-1228 (Jun. 1984).

Tan et al., "Precipitation of Polystyrene from Toluene with HFC-134a by the GAS Process", Ind. Eng. Chem. Res. (Apr. 9, 1998), 37, 1821-1826.
Mark et al., "Destruction of the flame retardant hexabromocyclododecane in a full-scale municipal solid waste incinerator", Waste Management & Research 2015, vol. 33(2) 165-174, Feb. 3, 2015.
Schlummer et al., "Recycling of Flame Retarded Waste Polystyrene Foams (EPS and XPS) to PS Granules Free of Hexabromocyclododecane (HBCDD)", Adv Recycling Waste Manag 2017, 2:2., May 15, 2017.
Anderson et al., "Chemical Recycling of Mixed Plastics in Electronic Waste Using Solvent-Based Processing", Processes, Jan. 2022, 10, 66.
Cigna et al., "Dynamic Mechanical Properties, Structure, and Composition of Impact Polystyrene", Journal of Applied Polymer Science, vol. 14, pp. 1781-1793 (1970). (The year or publication is sufficiently earlier than the effective U.S. filing date so that the particular month of publication is not an issue).
Gesner et al., "Phase Separation of Some Acrylonitrile-Butadiene-Styrene Resins", Journal of Polymer Science: Part A, vol. 3, pp. 3825-3831 (1965). (The year or publication is sufficiently earlier than the effective U.S. filing date so that the particular month of publication is not an issue).
Leal et al., "Evolution of the morphology of HIPS particles", Polymer 50 (2009) 68-76. (The year or publication is sufficiently earlier than the effective U.S. filing date so that the particular month of publication is not an issue).
Schlummer et al., "Report: Recycling of flame-retarded plastics from waste electric and electronic equipment (WEEE)", Waste Manage Res Jan. 2006: 24: 573-583. (The year or publication is sufficiently earlier than the effective U.S. iling date so that the particular month of publication is not an issue).
Strobl et al., "Recycling Potential for Non-Valorized Plastic Fractions from Electrical and Electronic Waste", Recycling Apr. 2021, 6, 33.
Turner et al., "Determination of Ungrafted Rubber in ABS Polymers", J. of Elastomers and Plastics, vol. 6 (Apr. 1974), p. 94.
English Translation—Machine Generated of JP2005154525A, "Method and Apparatus for Treating Polystyrene-Based Resin Composition", published on Jun. 16, 2005.
CreaCycle GmbH, "CreaSolv Closing the PS Loop: Our contribution to the concept of Circular Economy". Retrieved from the Internet <URL: http://www.creacycle.de/en/projects/recycling-of-expanded-poly-styrene-eps/polystyrene-loop-2016.html>, May 25, 2016.
Meuwissen et al. "CreaSolv closing the PS Loop Contribution to the concept of Circular Economy", Nairobi, UNEP Basel OEWG side event, May 30, 2016.
Arends, Dahmar et al. Removal of inorganic colour pigments from acrylonitrile butadiene styrene by dissolution-based recycling. J Master Cycles Waste Manag (2012) 14:85-93.
Rovere, Juliana et al. Role of the rubber particle and polybutadiene cis content on the toughness of high impact polystyrene. J Mater Sci (2008) 43:952-959.
Arostegui et al. Effect of Dissolution-Based Recycling on the Degradation and the Mechanical Properties of Acrylonitrileebutadieneestyrene Copolymer. Polymer Degradation and Stability 91 (2006) 2768-2774.
English Translation—Machine Translation of JP2002-264129. Published on Sep. 18, 2002.
English Translation—Machine Translation of CN111257270. Published on Jun. 9, 2020.
English Translation—Machine Translation of JP 093239. Published on Jan. 7, 1997.
English Translation—Machine Translation of DE 4319180. Published on Jan. 13, 1994.
English Translation of JP2002224652A, published on Aug. 13, 2002 (machine translation).
English Translation of JP2007144829A, published on Jun. 14, 2007 (machine translation).
English Translation of JP2005162847A, published on Jun. 23, 2005 (machine translation).

(56) References Cited

OTHER PUBLICATIONS

English Translation of JP2008063511A, published on Mar. 21, 2008 (machine translation).
English Translation of JP2015160900A, published on Sep. 7, 2015 (machine translation).
English Translation—Machine Translation of EP 0 894 818 A1, "Process for recycling soluble polymers or polymer blends from plastic containing materials" published on Feb. 3, 1999.
English Translation—Machine Translation of JP2016010906 "Method for removing flame retardant from foamed polystyrene" published in Jan. 21, 2016.
English Translation of WO2003011956 (Abstract only). Published Feb. 13, 2003.
Schlummer et al. Recycling of Styrene Polymers from Shredded Screen Housings Containing Brominated Flame Retardants. Journal of Applied Polymer Science, vol. 102, 1262-1273 (2006).
Grause et al. A novel process for the removal of bromine from styrene polymers containing brominated flame retardant. Polymer Degradation and Stability 112 (2015) 86-93.

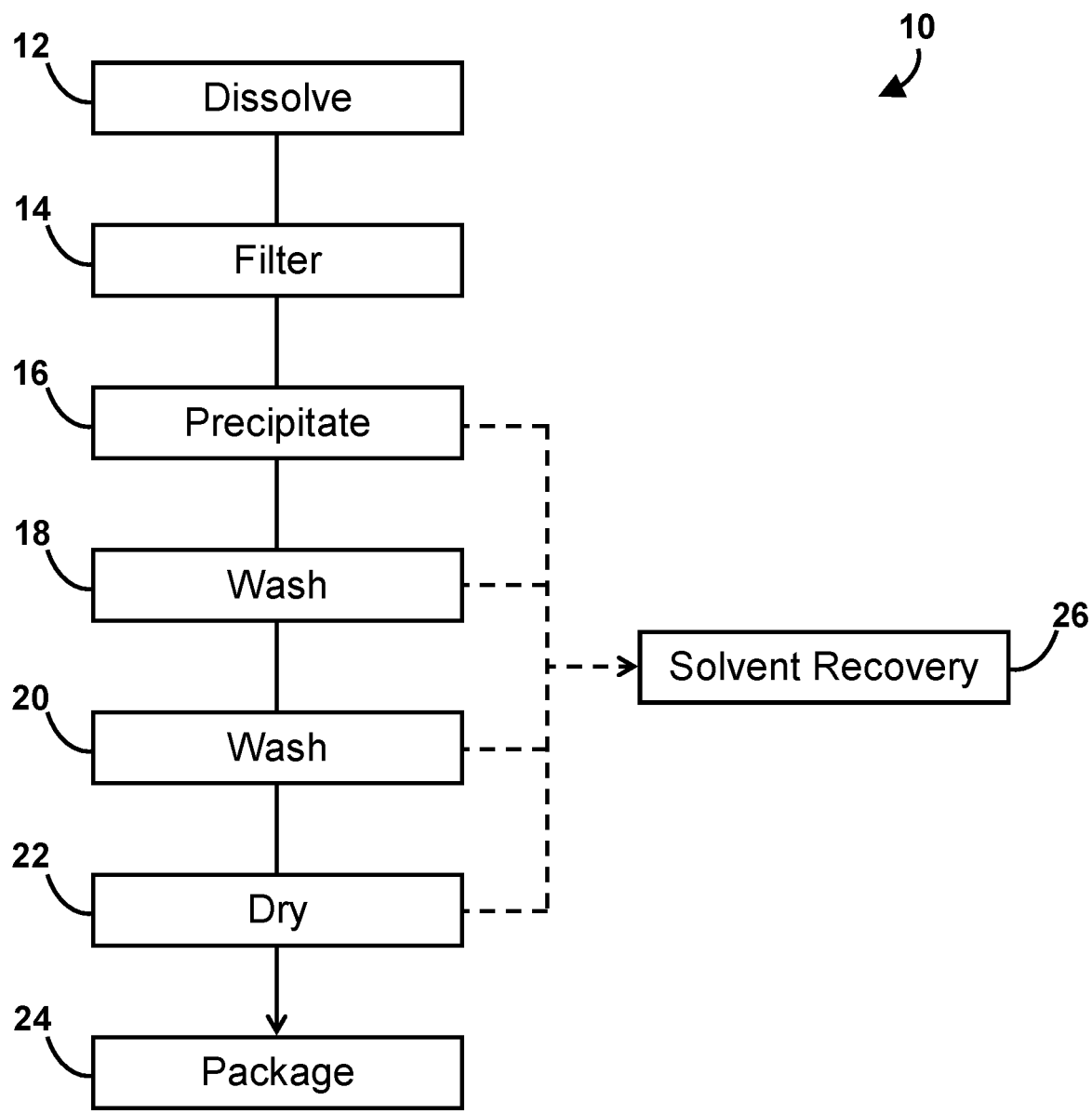

PROCESSES FOR RECYCLING POLYSTYRENE WASTE

The present application is a continuation application of U.S. application Ser. No. 17/353,395 filed on Jun. 21, 2021, that is a continuation application U.S. application Ser. No. 16/699,386 filed on Nov. 29, 2019, that is a continuation application of the U.S. application Ser. No. 15/515,817 filed on Mar. 30, 2017, which is a 35 USC 371 national stage entry of PCT/CA2015/051006 filed on Oct. 5, 2015, and that claims priority to U.S. 62/059,611 filed on Oct. 3, 2014. These documents are hereby incorporated by reference in their entirety.

The present disclosure relates to a process for recycling polystyrene waste. For example, it relates to a process for recycling polystyrene waste comprising dissolving the polystyrene waste in a solvent such as p-cymene then precipitating and washing the polystyrene with a non-solvent.

Polystyrene waste, for example, the packaging from electronic products or furniture, food trays, commercial products and insulation can, for example, have environmental consequences.

For example, whether post-consumer or post-industrial, the majority of polystyrene waste is buried in landfills. For example, every year in Quebec more than 40,000 tons of polystyrene waste is buried. Further, more than 60,000 tons of new polystyrene is bought and consumed every year in Quebec.

Known processes for recycling polystyrene do not produce recycled polystyrene having the same properties as new polystyrene. For example, known methods of polystyrene do not prepare recycled polystyrene having a Melt Flow Index (MFI) which meets technical specifications for using the recycled polystyrene for the same uses as new polystyrene is used for. To compensate this loss of mechanical properties, the recycled polystyrene is blended with new polystyrene in a proportion that rarely can exceed 20%, even for the less stringent applications.

Most industrial polystyrene objects are not composed only of polystyrene; for example, they may contain chemicals added to a polymer to modify some physical, biological and/or chemical property. Examples of additives are: coloring agents, fillers, flame retardants, lubricants and plasticizers.

It would thus be desirable to be provided with a recycled polystyrene and a process for recycling polystyrene waste that would at least partially solve one of the problems mentioned or that would be an alternative to the known processes for recycling polystyrene waste.

Therefore according to an aspect of the present disclosure, there is provided a recycled polystyrene having a melt flow index of less than about 25 g/10 min measured according to ASTM D1238-13.

According to another aspect of the present disclosure, there is provided a recycled polystyrene having a melt flow index of less than about 25 g/10 min measured according to ASTM D1238-13 standard and an additive content of less than about 1 wt %.

According to another aspect of the present disclosure, there is provided a recycled polystyrene having a melt flow index of less than about 25 g/10 min measured according to ASTM D1238-13 standard and a ash content of less than about 1 wt %, measured according to ASTM D5630-13 standard.

According to another aspect of the present disclosure, there is provided a recycled polystyrene having a melt flow index of less than about 25 g/10 min measured according to ASTM D1238-13 standard and an ash content of less than about 0.5 wt %, measured according to ASTM D5630-13 standard.

According to another aspect of the present disclosure, there is provided a recycled polystyrene having a melt flow index of less than about 25 g/10 min.

According to another aspect of the present disclosure, there is provided a recycled polystyrene having a melt flow index of less than about 25 g/10 min, measured according to ASTM D1238-13 standard.

According to another aspect of the present disclosure, there is provided a process for recycling polystyrene waste, comprising:
dissolving the polystyrene waste in p-cymene under conditions to obtain a polystyrene/p-cymene mixture;
adding the polystyrene/p-cymene mixture to a first portion of hydrocarbon polystyrene non-solvent under conditions to obtain precipitated polystyrene and a first portion of hydrocarbon waste solution;
separating the precipitated polystyrene from the first portion of hydrocarbon waste solution;
optionally repeating the dissolving, adding and separating;
washing the precipitated polystyrene with a second portion of hydrocarbon polystyrene non-solvent under conditions to obtain washed polystyrene and a second portion of hydrocarbon waste solution;
separating the washed polystyrene from the second portion of hydrocarbon waste solution;
washing the washed polystyrene with a third portion of hydrocarbon polystyrene non-solvent under conditions to obtain twice-washed polystyrene and a third portion of hydrocarbon waste solution;
separating the twice-washed polystyrene from the third portion of hydrocarbon waste solution; and
optionally drying the twice-washed polystyrene under conditions to obtain dried polystyrene.

Therefore according to another aspect of the present disclosure, there is provided a process for recycling polystyrene waste, comprising:
dissolving the polystyrene waste in p-cymene under conditions to obtain a polystyrene/p-cymene mixture;
adding the polystyrene/p-cymene mixture to a first portion of hydrocarbon polystyrene non-solvent under conditions to obtain precipitated polystyrene and a first portion of hydrocarbon waste solution;
separating the precipitated polystyrene from the first portion of hydrocarbon waste solution;
optionally repeating the dissolving, adding and separating;
washing the precipitated polystyrene with a second portion of hydrocarbon polystyrene non-solvent under conditions to obtain washed polystyrene and a second portion of hydrocarbon waste solution;
separating the washed polystyrene from the second portion of hydrocarbon waste solution;
washing the washed polystyrene with a third portion of hydrocarbon polystyrene non-solvent under conditions to obtain twice-washed polystyrene and a third portion of hydrocarbon waste solution;
separating the twice-washed polystyrene from the third portion of hydrocarbon waste solution;
removing surplus hydrocarbon waste solution by wringing and/or compressing the twice-washed polystyrene; and
drying the twice-washed polystyrene under conditions to obtain dried polystyrene.

The present disclosure also includes recycled polystyrene prepared according to a process for recycling polystyrene waste of the present disclosure.

Polystyrene waste such as expanded polystyrene waste is typically bulky but light whereas the polystyrene/p-cymene mixture typically has a higher density which may therefore cost less to transport. Accordingly, the processes of the present disclosure may, for example, save on transportation costs if, for example, the polystyrene/p-cymene mixture is obtained at a first location and the process further comprises transporting the polystyrene/p-cymene mixture to a second location wherein subsequent steps in the process are carried out.

The process for recycling polystyrene waste of the present disclosure may, for example allow removal of most additives (for example, chemicals added to a polymer to modify some physical, biological and/or chemical property) and can produce recycled polystyrene having properties very close to that of new polystyrene. The recycled polystyrene prepared from the processes of the present disclosure may, for example, be suitable for use for the same uses as new polystyrene such as for the preparation of new polystyrene articles. For example, the recycled polystyrene prepared from the processes of the present disclosure may, for example, have an MFI within a useful range for such uses.

It was found that the recycled polystyrenes of the present disclosure and the processes for obtaining same were quite useful. In fact, it was found that such recycled polymers and processes allowed for providing recycled polystyrene having a very low content of additives (fillers and/or lubricants). That also leads to recycled polystyrene having a very low content in ash. For example, when applying these processes to white expanded or extruded polystyrene, the final product is very clear and transparent to light transmission. Such a feature of the polymers and processes of the present disclosure are very interesting since it allows for significantly increasing the life cycle of recycled polystyrene. In fact, use of recycled polystyrene is quite often limited in view of the various additives contained therein and they therefore do not meet the requirements for certain uses or applications that can be made with polystyrene. Some manufacturer will also be reluctant to use recycled polystyrene since it can have a too high content of additives and it may affect or diminish the properties of the polystyrene or products made with such recycled polystyrene. This is clearly not the case with the polymers and processes mentioned in the present disclosure. On the contrary, such very low amounts of additives and/or fillers found in the polymers of the present disclosure allow for using these recycled polystyrenes in many different applications and also to recycle them many many times since merely never reaching high quantities of additives and/or fillers since user of such products is not mandatory to recycle them and to obtain low MFI values.

Thus the polymers and processes of the present disclosure allow for increasing the life cycle of recycled polystyrene (it is possible to recycle it many many times while maintaining the required specifications and properties) and also they have a very low MFI, while avoiding the use of large quantities of additives and/or fillers.

BRIEF DESCRIPTION OF THE DRAWINGS

In the following drawings, which represent by way of example only, various embodiments of the disclosure:

FIG. 1 is a schematic diagram of a process according to an embodiment of the present disclosure.

Unless otherwise indicated, the definitions and embodiments described in this and other sections are intended to be applicable to all embodiments and aspects of the present disclosure herein described for which they are suitable as would be understood by a person skilled in the art.

As used in the present disclosure, the singular forms "a", "an" and "the" include plural references unless the content clearly dictates otherwise. For example, an embodiment including "a hydrocarbon polystyrene non-solvent" should be understood to present certain aspects with one hydrocarbon polystyrene non-solvent, or two or more additional hydrocarbon polystyrene non-solvents.

In embodiments comprising an "additional" or "second" component, such as an additional or second hydrocarbon polystyrene non-solvent, the second component as used herein is different from the other components or first component. A "third" component is different from the other, first, and second components, and further enumerated or "additional" components are similarly different.

The term "additive" as used herein refers to chemicals added to a polymer to modify at least one physical, biological and/or chemical property. Non-limitative examples of additives are: coloring agents, fillers, flame retardants, lubricants and plasticizers.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "hydrocarbon polystyrene non-solvent" as used herein refers, for example, to a hydrocarbon-based compound or a mixture thereof in which polystyrene is substantially insoluble. The selection of a suitable hydrocarbon polystyrene non-solvent for the processes of the present disclosure can be made by a person skilled in the art. For example, it will be appreciated by a person skilled in the art that most non-polar additives typically found in polystyrene waste (e.g. hexabromocyclododecane and silicone oils) and p-cymene should be substantially soluble in the hydrocarbon polystyrene non-solvent under the conditions used in the processes of the present disclosure to obtain precipitated polystyrene as well as steps which comprise washing with the hydrocarbon polystyrene non-solvent. It will also be appreciated by a person skilled in the art that it may, for example, be useful to select a hydrocarbon polystyrene non-solvent having a boiling point that is around or slightly above the glass transition temperature ($T_g$) of the polystyrene waste being recycled.

The below presented examples are non-limitative and are used to better exemplify the processes of the present disclosure.

An exemplary process flow diagram for a process of the present disclosure is shown in FIG. 1. The exemplified process 10 is a process for recycling polystyrene waste. Referring to FIG. 1, in the exemplified process 10, polystyrene waste can be dissolved 12 in p-cymene under conditions to obtain a polystyrene/p-cymene mixture. If, for example, the polystyrene/p-cymene mixture comprises insoluble material, the polystyrene/p-cymene mixture can then optionally be filtered 14 under conditions to remove the insoluble material. The polystyrene/p-cymene mixture can then be added 16 to a first portion of hydrocarbon polystyrene non-solvent under conditions to obtain precipitated polystyrene and a first portion of hydrocarbon waste solution. The precipitated polystyrene can then be separated from the first portion of hydrocarbon waste solution. The dissolving, adding and separating can optionally be repeated. Then, the precipitated polystyrene can be washed 18 with a second portion of hydrocarbon polystyrene non-solvent under conditions to obtain washed polystyrene and a second portion of hydrocarbon waste solution. The washed polystyrene can then be separated from the second portion of hydrocarbon waste solution. The washed polystyrene can then be washed 20 with a third portion of hydrocarbon polystyrene non-solvent under conditions to obtain twice-washed polystyrene and a third portion of hydrocarbon waste solution. The twice-washed polystyrene can then be separated from the third portion of hydrocarbon waste solution. Surplus hydrocarbon waste solution can then optionally be removed by wringing and/or compressing the twice-washed polystyrene. The twice-washed polystyrene can then optionally be dried 22 under conditions to obtain dried polystyrene. The dried polystyrene can then optionally be packaged 24, for example the process can further comprise processing the dried polystyrene under conditions to obtain polystyrene pellets and the polystyrene pellets can be packaged 24. The p-cymene and/or the hydrocarbon polystyrene non-solvent can optionally be recovered 26, for example by a process comprising distilling the first portion of hydrocarbon waste solution, the second portion of hydrocarbon waste solution and/or the third portion of hydrocarbon waste solution under conditions to obtain p-cymene and/or hydrocarbon polystyrene non-solvent. The p-cymene can optionally be recycled for use in the dissolving 12. The hydrocarbon polystyrene non-solvent can optionally be recycled for use in the adding 16, the first washing 18 and/or the second washing 20.

For example, the polystyrene/p-cymene mixture can comprise polystyrene in an amount equal to or less than about 33 wt %, based on the total weight of the polystyrene/p-cymene mixture.

For example, the polystyrene/p-cymene mixture can comprise polystyrene in an amount of from about 10 wt % to about 30 wt %, based on the total weight of the polystyrene/p-cymene mixture.

For example, the polystyrene/p-cymene mixture can comprise polystyrene in an amount of from about 14 wt % to about 28 wt %, based on the total weight of the polystyrene/p-cymene mixture.

For example, the polystyrene/p-cymene mixture can comprise polystyrene in an amount of from about 15 wt % to about 27 wt %, based on the total weight of the polystyrene/p-cymene mixture.

For example, the polystyrene/p-cymene mixture can comprise polystyrene in an amount of from about 16 wt % to about 25 wt %, based on the total weight of the polystyrene/p-cymene mixture.

For example, the polystyrene waste can be dissolved in the p-cymene in a container having a chamber containing the p-cymene and at least one opening to the chamber for adding the polystyrene waste to the p-cymene, and the process can further comprise adding the polystyrene waste to the p-cymene contained in the chamber.

For example, the container can further comprise a vent.

For example, the container can further comprise a means to impel the polystyrene waste into the p-cymene.

For example, the means to impel the polystyrene waste into the p-cymene can comprise a metallic grid inside the container.

For example, the container can further comprise a means to indicate when capacity of the chamber has been reached.

For example, the means to indicate when capacity of the container has been reached can be an indicator light.

For example, the indicator light can be connected to a float switch in the chamber.

For example, the polystyrene/p-cymene mixture can comprise insoluble material and the process can further comprise filtering the polystyrene/p-cymene mixture under conditions to remove the insoluble material prior to adding the polystyrene/p-cymene mixture to the first portion of hydrocarbon polystyrene non-solvent. For example, the insoluble material can be chosen from a polystyrene/butadiene mixture, copolymers of styrene dust, a sticker, metal, wood, plastic, contaminants and mixtures thereof. For example, the filtering can comprise a multistage filtration process from coarse to fine. For example, butadiene will be soluble in p-cymene unless it has been heavily cross linked.

For example, the conditions to obtain the precipitated polystyrene and the first portion of hydrocarbon waste solution can comprise adding the polystyrene/p-cymene mixture to the first portion of hydrocarbon polystyrene non-solvent at the boiling point of the hydrocarbon polystyrene non-solvent and agitating for a time for diffusion of the p-cymene from the polystyrene/p-cymene mixture into the hydrocarbon polystyrene non-solvent to proceed to a sufficient extent.

For example, the time can be from about 5 minutes to about 10 minutes.

For example, the agitating can comprise stirring with a mechanical stirrer.

For example, greater than about 90 wt % of the p-cymene in the polystyrene/p-cymene mixture can diffuse into the hydrocarbon polystyrene non-solvent, based on the total weight of the polystyrene/p-cymene mixture.

For example, the ratio by volume of the first portion of hydrocarbon polystyrene non-solvent to the polystyrene/p-cymene mixture can be from about 2:1 to about 4:1.

For example, the ratio by volume of the first portion of hydrocarbon polystyrene non-solvent to the polystyrene/p-cymene mixture can be about 3:1.

For example, the precipitated polystyrene can be separated from the first portion of hydrocarbon waste solution by a process comprising decanting the first portion of hydrocarbon waste solution from the precipitated polystyrene.

For example, the conditions to obtain the washed polystyrene and the second portion of hydrocarbon waste solution can comprise adding the second portion of hydrocarbon polystyrene non-solvent to the precipitated polystyrene at the boiling point of the hydrocarbon polystyrene non-solvent and agitating for a time for diffusion of the p-cymene from the precipitated polystyrene into the hydrocarbon polystyrene non-solvent to proceed to a sufficient extent.

For example, the time can be from about 1 minute to about 15 minutes. For example, the time can be about 10 minutes. For example, the time can be from about 2 minutes to about 5 minutes. For example, the agitating can comprise stirring with a mechanical stirrer.

For example, the washed polystyrene can comprise less than about 0.3 wt % p-cymene. For example, the washed polystyrene can comprise less than about 0.1 wt % p-cymene.

For example, the ratio by volume of the second portion of hydrocarbon polystyrene non-solvent to the precipitated polystyrene can be from about 1:2 to about 2:1. For example, the ratio by volume of the second portion of hydrocarbon polystyrene non-solvent to the precipitated polystyrene can be about 1:1.

For example, the washed polystyrene can be separated from the second portion of hydrocarbon waste solution by a process comprising decanting the second portion of hydrocarbon waste solution from the washed polystyrene.

For example, the conditions to obtain the twice-washed polystyrene and the third portion of hydrocarbon waste solution can comprise adding the third portion of hydrocarbon polystyrene non-solvent to the washed polystyrene at the boiling point of the hydrocarbon polystyrene non-solvent and agitating for a time for diffusion of the p-cymene from the washed polystyrene into the hydrocarbon polystyrene non-solvent to proceed to a sufficient extent.

For example, the time can be from about 1 minute to about 10 minutes. For example, the time can be about 5 minutes. For example, the agitating can comprise stirring with a mechanical stirrer.

For example, the twice-washed polystyrene can comprise less than about 0.1 wt % p-cymene. For example, the twice-washed polystyrene can comprise less than about 0.05 wt % p-cymene.

For example, the ratio by volume of the third portion of hydrocarbon polystyrene non-solvent to the washed polystyrene can be from about 1:2 to about 2:1. For example, the ratio by volume of the third portion of hydrocarbon polystyrene non-solvent to the washed polystyrene can be about 1:1.

For example, the twice-washed polystyrene can be separated from the third portion of hydrocarbon waste solution by a process comprising decanting the third portion of hydrocarbon waste solution from the twice-washed polystyrene.

For example, after separating the twice-washed polystyrene from the third portion of hydrocarbon waste solution and prior to drying, the process can further comprise removing surplus hydrocarbon waste solution by wringing and/or compressing the twice-washed polystyrene.

For example, at least one of the first portion of hydrocarbon polystyrene non-solvent, the second portion of hydrocarbon polystyrene non-solvent and the third portion of hydrocarbon polystyrene non-solvent can comprise, consist essentially of or consist of a hydrocarbon polystyrene non-solvent having a boiling point at 1 atm of pressure of from about 98° C. to about 110° C. or about 105° C. to about 110° C.

For example, the first portion of hydrocarbon polystyrene non-solvent, the second portion of hydrocarbon polystyrene non-solvent and the third portion of hydrocarbon polystyrene non-solvent can comprise, consist essentially of or consist of a $C_6$-$C_8$ alkane or a petroleum distillate.

For example, the first portion of hydrocarbon polystyrene non-solvent, the second portion of hydrocarbon polystyrene non-solvent and the third portion of hydrocarbon polystyrene non-solvent can comprise, consist essentially of or consist of a $C_6$-$C_8$ alkane.

For example, the first portion of hydrocarbon polystyrene non-solvent, the second portion of hydrocarbon polystyrene non-solvent and the third portion of hydrocarbon polystyrene non-solvent can comprise, consist essentially of or consist of a petroleum distillate.

For example, the first portion of hydrocarbon polystyrene non-solvent, the second portion of hydrocarbon polystyrene non-solvent and the third portion of hydrocarbon polystyrene non-solvent can comprise, consist essentially of or consist of n-heptane.

For example, the first portion of hydrocarbon polystyrene non-solvent, the second portion of hydrocarbon polystyrene non-solvent and the third portion of hydrocarbon polystyrene non-solvent can all be the same hydrocarbon polystyrene non-solvent.

For example, the first portion of hydrocarbon polystyrene non-solvent, the second portion of hydrocarbon polystyrene non-solvent and the third portion of hydrocarbon polystyrene non-solvent can all be different hydrocarbon polystyrene non-solvents.

For example, the second portion of hydrocarbon polystyrene non-solvent and the third portion of hydrocarbon polystyrene non-solvent can be the same hydrocarbon polystyrene non-solvent and the first portion of hydrocarbon polystyrene non-solvent can be a different hydrocarbon polystyrene non-solvent.

For example, the second portion of hydrocarbon polystyrene non-solvent and the third portion of hydrocarbon polystyrene non-solvent can comprise, consist essentially of or consist of n-heptane and the first portion of hydrocarbon polystyrene non-solvent can comprise, consist essentially of or consist of n-hexane.

For example, the conditions to obtain the dried polystyrene can comprise drying the twice-washed polystyrene for a temperature and time for removal of remaining hydrocarbon polystyrene non-solvent to proceed to a sufficient extent. For example, the twice-washed polystyrene can be dried at a temperature of from about 115° C. to about 125° C. For example, the twice-washed polystyrene can be dried at a temperature of about 120° C.

For example, the conditions to obtain the dried polystyrene can comprise drying the twice-washed polystyrene using an infrared dryer for a time for removal of remaining hydrocarbon polystyrene non-solvent to proceed to a sufficient extent.

For example, the polystyrene waste can comprise polar impurities and the process can further comprise washing the polystyrene waste with a polar organic solvent under conditions to remove the polar impurities.

For example, the polar organic solvent can comprise, consist essentially of or consist of methanol or ethanol. For example, the polar organic solvent can comprise, consist essentially of or consist of methanol. For example, the polar organic solvent can comprise, consist essentially of or consist of ethanol.

For example, the process can further comprise distilling the first portion of hydrocarbon waste solution, the second portion of hydrocarbon waste solution and/or the third portion of hydrocarbon waste solution under conditions to obtain p-cymene and/or hydrocarbon polystyrene non-solvent.

For example, the process can further comprise recycling the p-cymene for use in the dissolving step.

For example, the process can further comprise recycling the hydrocarbon polystyrene non-solvent for use in the adding step, the first washing step and/or the second washing step.

For example, the process can further comprise processing the dried polystyrene under conditions to obtain polystyrene pellets. For example, the conditions to obtain the polystyrene pellets can comprise extruding the dried polystyrene at a temperature of from about 140° C. to about 160° C.

For example, the process can further comprise packaging the polystyrene pellets. Suitable means to package the polystyrene pellets can be selected by a person skilled in the art.

For example, the process can further comprise adding an antioxidant during the dissolving step, the adding step, the first washing step and/or the second washing step. For example, the process can further comprise adding an antioxidant during the dissolving step.

For example, the antioxidant can comprise, consist essentially of or consist of octadecyl-3-(3,5-di-tert-butyl-4-hydroxyphenyl)-propionate.

For example, the antioxidant can be added in an amount of from about 0.1 wt % to about 2 wt %, based on the total weight of the polystyrene. For example, the antioxidant can be added in an amount of about 1 wt %, based on the total weight of the polystyrene.

For example, the antioxidant can be added in an amount of from about 0.5 wt % to about 2 wt %, based on the total weight of the polystyrene. For example, the antioxidant can be added in an amount of about 1 wt %, based on the total weight of the polystyrene.

For example, the process can further comprise adding an additive for lowering or increasing melt flow index to the polystyrene/p-cymene mixture.

For example, the additive for lowering melt flow index can comprise, consist essentially of or consist of lime, talc, silicon oxide, silicon hydroxide, aluminum oxide, aluminum hydroxide, or combinations thereof. For example, the additive for lowering melt flow index can comprise, consist essentially of or consist of lime. For example, the additive for lowering melt flow index can comprise, consist essentially of or consist of talc.

For example, the additive for increasing melt flow index can comprise, from about 0.0001 wt % to about 1 wt % of silicon oil. For example, silicon oil can be added from about 0.01 wt % to 0.1 wt %.

For example, the additive for lowering melt flow index can be added in an amount of from about 0.5 wt % to about 25 wt %, based on the total weight of the polystyrene. For example, the additive for lowering melt flow index can be added in an amount of about 0.5 wt % to about 5 wt %, based on the total weight of the polystyrene. For example, the additive for lowering melt flow index can be added in an amount of about 1 wt %, based on the total weight of the polystyrene.

For example, the polystyrene waste can be post-industrial waste, post-consumer waste or a combination thereof. For example, the polystyrene waste can be post-industrial waste. For example, the polystyrene waste can be post-consumer waste. For example, the polystyrene waste can be a combination of post-industrial waste and post-consumer waste.

For example, the polystyrene waste can comprise, consist essentially of or consist of expanded polystyrene. For example, the polystyrene waste can comprise, consist essentially of or consist of white, expanded polystyrene. For example, the polystyrene waste can comprise, consist essentially of or consist of compressed polystyrene.

For example, the process can further comprise grinding the polystyrene waste prior to dissolving.

For example, the polystyrene/p-cymene mixture can be obtained at a first location and the process can further comprise transporting the polystyrene/p-cymene mixture to a second location wherein subsequent steps in the process can be carried out.

The present disclosure also includes recycled polystyrene prepared according to a process for recycling polystyrene waste of the present disclosure.

For example, the waste polystyrene can comprise other copolymers. For example, it can comprise butadiene (polybutadiene, high-impact polystyrene HIPS), be a copolymer of styrene and acrylonitrile (SAN) or acrylonitrile, butadiene and styrene (ABS).

For example, the waste polystyrene can be a polystyrene-co-butadiene copolymer.

For example, embodiments relating to the recycled polystyrene of the present disclosure can be varied as discussed herein in respect of the processes for recycling polystyrene waste of the present disclosure.

For example, the recycled polystyrene can have a melt flow index of less than about 40 g/10 min. For example, the recycled polystyrene can have a melt flow index of from about 3 to about 30 g/10 min. For example, the recycled polystyrene can have a melt flow index of from about 3 to about 25 g/10 min. For example, the recycled polystyrene can have a melt flow index of less than about 25 g/10 min. For example, the recycled polystyrene can have a melt flow index of from about 10 to about 20 g/10 min.

For example, the recycled polystyrene can have a melt flow index of less than about 40 g/10 min. For example, the recycled polystyrene can have a melt flow index of from about 5 to about 30 g/10 min. For example, the recycled polystyrene can have a melt flow index of from about 5 to about 25 g/10 min. For example, the recycled polystyrene can have a melt flow index of less than about 25 g/10 min. For example, the recycled polystyrene can have a melt flow index of from about 10 to about 20 g/10 min.

For example, the recycled polystyrene can have a melt flow index of less than about 30 g/10 min. For example, the recycled polystyrene can have a melt flow index of from about 3 to about 25 g/10 min. For example, the recycled polystyrene can have a melt flow index of from about 1 to about 15 g/10 min. For example, the recycled polystyrene can have a melt flow index of from about 10 to about 15 g/10 min. For example, the recycled polystyrene can have a melt flow index of from about 5 to about 12 g/10 min. For example, the recycled polystyrene can have a melt flow index of from about 2 to about 12 g/10 min. For example, the recycled polystyrene can have a melt flow index of less than about 15 g/10 min. For example, the recycled polystyrene can have a melt flow index of less than about 12 g/10 min.

For example, the recycled polystyrene can have a content of additive(s) of less than about 5 wt %.

For example, the recycled polystyrene can have a content of additive(s) of less than about 3 wt %.

For example, the recycled polystyrene can have a content of additive(s) of less than about 2 wt %.

For example, the recycled polystyrene can have a content of additive(s) of less than about 1 wt %.

For example, the recycled polystyrene can have a content of additive(s) of less than about 0.5 wt %.

For example, the recycled polystyrene can have a content of additive(s) of less than about 0.1 wt %.

For example, the recycled polystyrene can have a content of additive(s) of less than about 0.05 wt %.

For example, the recycled polystyrene can have a content of additive(s) of about 0.05 wt % to about 1 wt %.

For example, the recycled polystyrene can have a content of additive(s) of about 0.1 wt % to about 1 wt %.

For example, the recycled polystyrene can have a filler content of less than about 5 wt %.

For example, the recycled polystyrene can have a filler content of less than about 3 wt %.

For example, the recycled polystyrene can have a filler of less than about 2 wt %.

For example, the recycled polystyrene can have a filler content of less than about 1 wt %.

For example, the recycled polystyrene can have a filler content of less than about 0.5 wt %.

For example, the recycled polystyrene can have a filler content of less than about 0.1 wt %.

For example, the recycled polystyrene can have a filler content of less than about 0.05 wt %.

For example, the recycled polystyrene can have a filler content of about 0.05 wt % to about 1 wt %.

For example, the recycled polystyrene can have a filler content of about 0.1 wt % to about 1 wt %.

For example, the filler can be an inorganic filler.

For example, the recycled polymer can be obtained by recycling a polystyrene waste by involving a treatment with a solvent and a non-solvent.

For example, the recycled polymer can be obtained by recycling a polystyrene waste by involving a treatment with a solvent that is p-cymene and a hydrocarbon polystyrene non-solvent that is $C_6$-$C_8$ alkane or mixtures thereof.

For example, the polystyrene waste can comprises polystyrene having an average molecular weight of about 200,000 to about 350,000 g/mol.

For example, the polystyrene waste can comprises polystyrene having an average molecular weight of about 230,000 to about 260,000 g/mol.

For example, the polystyrene waste can comprises polystyrene having an average molecular weight of about 260,000 to about 300,000 g/mol.

For example, the recycled polystyrene can be transparent.

For example, the recycled polystyrene can be clear.

For example, the recycled polystyrene can be substantially transparent.

For example, the recycled polystyrene can be at least substantially transparent.

For example, the recycled polystyrene can be obtained by any of the processes and/or methods described in the present disclosure.

There is provided the use of the recycled polystyrenes of the present disclosure for preparing a mixture comprising said recycled polystyrene and a virgin polystyrene.

There is also provided a method of using the recycled polystyrenes of the present disclosure comprising mixing the recycled polystyrene with a virgin polystyrene.

For example, the mixture can comprise at least about 10 wt %, at least about 15 wt %, at least about 20 wt %, about 1 wt % to about 50 wt %, about 5 wt % to about 50 wt %, or about 5 wt % to about 30 wt % of the recycled polystyrene.

For example, the recycled polystyrene can comprise other copolymers. For example, it can comprise butadiene (polybutadiene, high-impact polystyrene HIPS), be a copolymer of styrene and acrylonitrile (SAN) or acrylonitrile, butadiene and styrene (ABS).

For example, the recycled polystyrene can be a polystyrene-co-butadiene copolymer.

According to another aspect of the present disclosure, there is provided a method for managing recycling of polystyrene comprising:
  providing a customer with at least one container for storing polystyrene waste;
  providing the customer with instructions on how dissolving the polystyrene waste into the at least one container by using at least one solvent;
  optionally monitoring concentration of the polystyrene waste into the at least one solvent and/or a volume of liquid and/or solid contained in the at least one container;
  removing at least a portion of a liquid content contained in the at least one container and that comprises the polystyrene waste dissolved into the at least one solvent;
  optionally adding a quantity of the at least one solvent into the at least one container;
  transporting the at least a portion of the liquid content contained in the at least one container into a facility whereat the polystyrene waste is recycled or treated for converting the polystyrene waste into recycled polystyrene.

According to another aspect of the present disclosure, there is provided a method for storing polystyrene waste and recycling the polystyrene, the method comprising:
  dissolving a polystyrene waste into at least one container by using at least one solvent;
  optionally monitoring concentration of the polystyrene waste into the at least one solvent and/or a volume of liquid and/or solid contained in the at least one container;
  removing at least a portion of a liquid content contained in the at least one container and that comprises the polystyrene waste dissolved into the at least one solvent;
  optionally adding a quantity of the at least one solvent into the at least one container;
  transporting the at least a portion of the liquid content contained in the at least one container into a facility whereat the polystyrene waste is recycled or treated for converting the polystyrene waste into recycled polystyrene.

For example, recycling of the polystyrene or converting of the polystyrene waste into recycled polystyrene is carried out by a method as defined in the present disclosure.

For example, the transporting can be carried out by tank truck transportation.

For example, the transporting can be carried out by tank train transportation.

For example, the transporting can be carried out by means of a pipe.

For example, the transporting can be carried out by means of a pipeline.

EXAMPLES

Example 1

Recycling of Polystyrene Waste

In the present studies, polystyrene waste was recycled in a process which included five main steps, according to the following sequence:
1. Solubilisation of the polystyrene in p-cymene
2. Filtration of the PS/p-cymene mixture to remove undissolved materials
3. Washing with a non-polar solvent that is a non-solvent to PS
4. Drying
5. Forming and packaging PS plastic beads In the first step (solubilisation), polystyrene waste such as industrial post-consumption expanded polystyrene was dissolved in p-cymene (1-methyl-4-(1-methylethyl)benzene; one of the three possible isomers of cymene, and the only one that is also present in nature). The solubility limit of the polystyrene in the p-cymene is 33% (w/w) or 28.5% (v/v) at room temperature and the density of the polystyrene/p-cymene mixture reaches a value of 1.06 kg/L which is higher than the density of pure p-cymene which is 0.86 kg/L. It is possible to reach the solubility limit, but the dissolution rate is decreased by a factor of 3.

In the solubilisation step, the polystyrene loses its structural properties and a reduction of the volume it occupies occurs. Various non-polar additives including hexabromocyclododecane (HBCD) and the silicone oils used in its manufacture are dissolved in the p-cymene solvent. This step was performed in a closed, vented tank called the dissolution module. An object of the module is to maximize the amount of polystyrene that can be solubilised within a given period of time. For example, a metallic grid inside the dissolution module can push the expanded polystyrene objects into p-cymene which can reduce, for example, dissolution time from hours to minutes.

The third step (washing) had objectives which included: (1) the precipitation of the polystyrene; (2) recovery of the p-cymene in order to reuse it in step 1; and (3) elimination of the different additives that may alter the mechanical properties of the recycled polystyrene.

This step comprised first precipitating the solubilised polystyrene with hexane, heptane or any other hydrocarbon with a suitable boiling point. While heptane was observed to provide the best results in the washing step, other hydrocarbons may also be useful. Hexane and octane were tested in the present studies. Petroleum distillates with a boiling point of from about 100° C. to about 120° C. may also be useful and may provide, for example, reduced process and/or operating costs.

For example, the solvent may have a boiling point around or slightly above the $T_g$ for the polystyrene waste. While the $T_g$ of polystyrene may vary, for example as a function of molecular weight, the $T_g$ for the polystyrene waste is typically about 98° C. It will be appreciated by a person skilled in the art that there is typically only a small variation of $T_g$ with molecular weight or polydispersity for most polystyrenes used in the fabrication of industrial polystyrene objects. Accordingly, the solvent may have a boiling point up to about 110° C., for example a boiling point of about 105° C. to about 110° C. at 1 atm pressure. A suitable hydrocarbon solvent may, for example enable more than 90% of the p-cymene to migrate into it and is a non-solvent for polystyrene.

To carry out the first washing step (i.e. precipitating the polystyrene), the mixture of solubilised polystyrene in p-cymene was slowly poured into a double wall stainless steel tank containing the hydrocarbon at its boiling temperature. In an exemplary experiment hexane at its boiling temperature (69° C.) was used for this step. In other exemplary experiments heptane at its boiling temperature (98° C.) was used for this step. The entire mixture was moderately stirred through use of a mechanical stirrer. The volume of polystyrene/p-cymene solution added to the hydrocarbon was in a polystyrene/p-cymene solution to hydrocarbon ratio by volume of 1:3. Under these conditions, the polystyrene precipitated in the form of a sticky white paste. The stirring time (from about 5 minutes to about 10 minutes) allowed for a useful amount of diffusion of the p-cymene into the hydrocarbon. Afterward, the solvent mixture supernatant was removed by a simple decantation, after which it was possible to perform a second washing of the precipitated polystyrene.

The second washing was performed in the same tank with heptane. A defined volume of heptane having a boiling temperature of 98° C. was introduced into the tank, according to a polystyrene:heptane ratio by volume of 1:1. The whole mixture was boiled at atmospheric pressure under moderate mechanical stirring over about 2 minutes to about 5 minutes. Using a different hydrocarbon in the second wash than in the first wash increased the malleability of the polystyrene which, for example, increased diffusion of the remaining p-cymene solvent out of the precipitated polystyrene and into the hydrocarbon. Thereafter, the supernatant solvent mixture was removed by a simple decantation. According to the calculations of washing efficiency, less than 0.1% p-cymene remained in the precipitated polystyrene at this stage.

A third washing with boiling heptane was used in order to further reduce the presence of p-cymene in the polystyrene. The presence of residual solvent may, for example, affect the melt index, also called melt flow index (MFI). The degree of washing efficiency is inversely proportional to the MFI. The washing conditions used were the same as in the second washing step.

The recovered solvent mixture contained hexane, heptane, p-cymene and/or any other hydrocarbon solvent used as well as non-polar additives extracted from the PS. The proportion of p-cymene and additives was higher in the first solvent mixture than in the second and third solvent mixtures. Fractional distillation was used to separate the different products. The p-cymene was reused for the solubilisation step while hexane and heptane were reused in the washing steps. The recovered additives were considered to be waste for disposal.

The fourth step (drying) comprised drying the polystyrene paste, which contained about 5-37% heptane in a dryer at a temperature of 120° C. An objective was to remove substantially all of the remaining solvent without altering the quality of the polymer.

The fifth step (packaging) comprised cutting the dried polystyrene into small pellets suitable for the distribution of the product to customers. A pelletizer as commonly used in the industry was utilized to control the size and the shape of the final product.

In order to limit the PS degradation which is mainly due to oxidation as observed during the drying and extrusion steps, a commercial antioxidant such as Irganox™ 1076 (octadecyl-3-(3,5-di-tert.butyl-4-hydroxyphenyl)-propionate) can be added in a proportion of about 1%, based on the weight of the polystyrene. This compound is acceptable for food applications, has a melting point of 50° C. and can be added at various times in the process: i.e. with the p-cymene, in the washing steps and/or at the final extrusion step.

Table 1 shows the results from recycling various types of waste polystyrene using steps of the above-described process.

TABLE 1[1]

| | Irganox 1076 (1 wt %) | | Melt Flow Index[3] (g/10 min) | | Product | Drying[4] |
|---|---|---|---|---|---|---|
| PS-cymene mixture[2] | yes | no | Result 1 | Result 2 | Color | (hours) |
| Polystyrene cooler (33 wt %) | | x | 25.2 | — | slightly yellowish | 120 |
| Polystyrene cooler (33 wt %) Poly(styrene-co-butadiene) (1.22 wt %) | | x | 16.5 | 14.8 | slightly yellowish | 120 |

TABLE 1[1]-continued

| PS-cymene mixture[2] | Irganox 1076 (1 wt %) yes | Irganox 1076 (1 wt %) no | Melt Flow Index[3] (g/10 min) Result 1 | Melt Flow Index[3] (g/10 min) Result 2 | Product Color | Drying[4] (hours) |
|---|---|---|---|---|---|---|
| Polystyrene cooler (33 wt %) Poly(styrene-co-butadiene) (1.22 wt %) | x | | 11.6 | — | white | 108 |
| Polystyrene cooler (33 wt %) Poly(styrene-co-butadiene) (4.86 wt %) | | x | 17.7 | 16.7 | yellowish | 120 |
| Polystyrene cooler (33 wt %) Poly(styrene-co-butadiene) (4.86 wt %) | x | | 12.3 | — | white | 108 |
| Poly(styrene-co-butadiene) (20 wt %) | x | | 13.3 | — | slightly yellowish | 108 |
| Poly(styrene-co-butadiene) (20 wt %) | | x | 17.2 | — | very yellow | 108 |
| Polystyrene regrind beads[5] (30 wt %) | | x | 6.8 | — | greyish | 120 |
| Polystyrene cooler (15 wt %) Polystyrene regrind beads (15 wt %) | | x | 10.3 | — | white | 120 |
| Polystyrene cooler (16.5 wt %) | | x | 10.6 | 9.9 | white | 120 |
| Polystyrene cooler (16.5 wt %) | x | | 6.28 | — | white | 48 |
| Polystyrene cooler (20 wt %) | x | | 10 | — | white | 48 |
| Polystyrene cooler (24 wt %) | x | | 11.8 | — | white | 48 |
| Polystyrene cooler (28 wt %) | x | | 11.7 | — | white | 48 |
| Polystyrene black tray (100 wt %) | x | | 3.2 | — | black | 0 |
| Polystyrene black tray (33 wt %) | x | | 5.5 | — | black | 120 |
| Polystyrene blue insulation (33 wt %) | | x | 14.3 | — | blue | 120 |
| Polystyrene blue insulation (33 wt %) | x | | 13.2 | — | blue | 120 |
| Dense polystyrene log (100 wt %) | | x | 38.7 | — | white | 0 |
| Dense polystyrene log (33 wt %) wrung and granulated before drying | x | | 6.27 | 6.27 | white | 48 |
| Polystyrene cooler (33 wt %) heated at 80° C. in first wash | x | | 9.2 | — | white | 120 |
| Polystyrene cooler (33 wt %) wrung and granulated before drying | x | | 7.98 | 7.6 | white | 48 |
| Polystyrene cooler (100 wt %) | | x | 36.8 | — | white | 0 |
| Polystyrene blue insulation (100 wt %) | | x | 20 | — | blue | 0 |
| Polystyrene cooler (33 wt %) Lime (1 wt %)[6] | x | | 8.1 | — | white | 48 |
| Polystyrene cooler (33 wt %) Lime (5 wt %)[6] | x | | 7.06 | — | white-yellow | 48 |
| Polystyrene cooler (33 wt %) Lime (10 wt %)[6] | x | | 6.13 | — | yellowish | 48 |
| Polystyrene cooler (33 wt %) Lime (25 wt %)[6] | x | | 4.88 | — | yellow | 48 |
| Polystyrene cooler (33 wt %) Talc (1 wt %)[6] | x | | 13.2 | — | white | 72 |
| Polystyrene cooler (33 wt %) Talc (5 wt %)[6] | x | | 12.7 | — | greyish | 72 |
| Polystyrene cooler (33 wt %) Talc (10 wt %)[6] | x | | 17.5 | — | greyish | 72 |
| Polystyrene cooler (33 wt %) Talc (25 wt %)[6] | x | | 11.3 | — | grey | 72 |
| Polystyrene sample that contains HBCD (100 wt %) | | x | 25.2 | — | white | 0 |
| Polystyrene sample that contains HBCD (20 wt %) | x | | 4.9 | 6.6 | white | 0 |

[1]All trials were performed using three washes with heptane in ratios by volume of heptane:PS/cymene mixture of 3:1, 1:1 and 1:1, respectively using extraction times of 15 minutes, 10 minutes and 5 minutes, respectively.
[2]The mixture for all trials also includes p-cymene to make up 100 wt % total.
[3]ASTM D1238 standard has been used for each result.
[4]In an oven at 120° C. using an aluminum plate having a diameter of 8 cm. The polystyrene dries with a thickness of <5 mm unless otherwise specified.
[5]The regrind beads come from trays and have already a lower melt flow index. That quality of polystyrene decreases the melt flow index in the mixture because of this high molecular weight.
[6]The lime and talc were added in the PS-cymene mixture before the washing.

The Irganox 1076 has the property of protection against oxidation. Many results showed a helpful effect on the product color. The addition of butadiene in styrene results in the formation of polystyrene-co-butadiene copolymer showing a much better resistance to impact than pure polystyrene. The butadiene units in polystyrene-co-butadiene could be used to create a three-dimensional matrix with the polymer chains. By creating links between the polymeric chains, the molecular weight increases and then the melt flow index must decrease. The poly(styrene-co-butadiene) polymer contains 4% of butadiene. A small amount of butadiene must be enough to see a difference on the melt flow index but the results were inconclusive.

As can be seen in Table 1, the experiments show better results when the polystyrene-cymene mixture has a lower concentration. The dilution of the mixture into the non-solvent increases the diffusion and thus the extraction of the solvent. The addition of solid particles in a polymer mixture is a common practice in the polystyrene industry to reduce cost or improve mechanical properties.

Table 2 shows the results of including the antioxidant Irganox 1076 at different steps in the process.

TABLE 2

| Addition of 1 wt % Irganox 1076 in a polystyrene cooler-cymene mixture (33 wt % polystyrene) | Melt Flow Index[1] (g/10 min) | | Product |
|---|---|---|---|
| | Result 1 | Result 2 | Color |
| Added directly in polystyrene/p-cymene mixture | 7.6 | 8.2 | white |
| Added to the heptane in first wash | 10.6 | — | white |
| Added to the heptane in third wash | 13.5 | — | white |

[1]ASTM D1238 standard has been used for each result.

As can be seen in Table 2, the product color for all samples was white. The MFI was lowest for the product produced from a process wherein the Irganox 1076 was added to the polystyrene/p-cymene mixture.

Table 3 shows the impact of a mechanical conditioning and the evolution of the drying steps. There is a difference of about 37.5% between the washed and the dry polystyrene. At this point, all the heptane has been evaporated. Also, only with a wringing and a granulating step, it is possible to eliminate 14% of the heptane from the washed polystyrene. The heptane is recovered in the process to repeat the washing treatment. The source of polystyrene does not have any significant effect in the drying step in these studies.

TABLE 3[1]

| PS-cymene mixture[2] | Mass (g) | | Heptane Evaporated[3] (wt %) |
|---|---|---|---|
| | Before Mec. cond. | After Mec. Cond. | |
| Polystyrene cooler (33 wt %) | 14.04 | 12.09 | 13.9 |
| Compressed polystyrene log (33 wt %) | 12.58 | 10.79 | 14.2 |
| | After Drying 15 hours | After Drying 17 hours | |
| Polystyrene cooler (33 wt %) | — | 8.81 | 37.3 |
| Compressed polystyrene log (33 wt %) | 7.93 | — | 37.0 |

TABLE 3[1]-continued

| PS-cymene mixture[2] | Mass (g) | | Heptane Evaporated[3] (wt %) |
|---|---|---|---|
| | Before Mec. cond. | After Mec. Cond. | |
| | After Drying 22 hours | After Drying 24 hours | |
| Polystyrene cooler (33 wt %) | — | 8.79 | 37.4 |
| Compressed polystyrene log (33 wt %) | 7.92 | — | 37.0 |
| | After Drying 46 hours | After Drying 48 hours | |
| Polystyrene cooler (33 wt %) | — | 8.77 | 37.5 |
| Compressed polystyrene log (33 wt %) | 7.89 | — | 37.3 |

[1]All drying carried out in an oven at 120° C.
[2]The mixture for all trials also includes p-cymene to make up 100 wt % total.
[3]Values provided as wt % based on the total mass before granulation.

Example 2

Further tests have been made for preparing recycled polystyrene. Such tests have been made by using a process similar as previously described in Example 1 but without any addition of Irganox. These tests have been made at a lab scale on real white expanded polystyrene used for packaging.

The results of such tests are thus provided below.

DSC (ASTM D3418): Tg=108.1° C.

IZOD Impact test (ASTM D4812): 4 tests with average Impact of 13.78 KJ/m$^2$ and 175.72 J/m and Energy=0.55 J with complete rupture.

TABLE 4

MFI tests
MFI (ASTM D1238 on a Dynisco D4002 at 200° C.):

| Test | MFI (g/10 min) |
|---|---|
| 1 | 11.44 |
| 2 | 11.01 |
| 3 | 10.70 |
| Average | 11.05 |

Ash Content (ASTM D5630): 0.10

TABLE 5

VICAT tests
VICAT Softening Temperature (ASTM D1525):

| Test | Thickness (mm) | VICAT softening Temperature (° C.) |
|---|---|---|
| 1 | 3.01 | 106.2 |
| 2 | 3.04 | 106.1 |
| 3 | 3.03 | 106.9 |

TABLE 6

VICAT tests
Traction Test (ASTM D638):

| Test | Thickness (mm) | Width (mm) | Maximum stress (MPa) | Elasticity Module (MPa) | Elongation at rupture (%) |
|---|---|---|---|---|---|
| 1 | 3.11 | 12.71 | 52.4 | 3095 | 2.4 |
| 2 | 3.11 | 12.75 | 52.2 | 2992 | 2.4 |
| 3 | 3.13 | 12.72 | 51.7 | 2990 | 2.4 |
| 4 | 3.11 | 12.72 | 51.7 | 3114 | 2.4 |
| 5 | 3.12 | 12.71 | 51.0 | 3029 | 2.2 |
| Average | | | 51.8 | 3044 | 2.4 |
| Standard deviation | | | 0.5 | 58 | 0.1 |

Example 3

Further tests have been made for preparing recycled polystyrene. Such tests have been made by using a process similar as previously described in Example 1. The process was carried out in continuous and a scale up was made to bring the process from a laboratory level to an industrial level. For example, the process allowed for preparing about 10 kg of recycled polystyrene per hour. It has to be noted that the limiting factors in the present case regarding the productivity of the process does not reside in the process per se but rather in certain types of equipment used for carrying out the process. By acquiring some equipment allowing for receiving larger volumes or greater quantity, the overall process can easily reach about 500 to about 1000 kg recycled polystyrene per hour.

The results of such tests are thus provided below.

MFI=22 g/10 min according to ASTM D1238-13 standard.

While a description was made with particular reference to the specific embodiments, it will be understood that numerous modifications thereto will appear to those skilled in the art. Accordingly, the above description and accompanying drawings should be taken as specific examples and not in a limiting sense.

The invention claimed is:

1. A method of using p-cymene, said method comprising contacting said p-cymene with polystyrene and a non-solvent having a boiling point at 1 atm of pressure of from 98° C. to 110° C. for recycling said polystyrene;
   wherein the non-solvent is an alkane or mixtures thereof; and
   wherein p-cymene is used for dissolving polystyrene and the non-solvent is used for precipitating polystyrene as a paste.

2. The method of claim 1, wherein precipitation of polystyrene is carried out at the boiling point of said non-solvent.

3. The method of claim 1, wherein said non-solvent is heptane.

4. The method of claim 3, wherein polystyrene is precipitated from a mixture comprising p-cymene, heptane and polystyrene and being at a temperature of about 98° C.

* * * * *